United States Patent [19]
Steineke

[11] 3,813,852
[45] June 4, 1974

[54] METHOD OF RECOVERING FLUORINE FROM WASTE GASES

[75] Inventor: Fredrik Steineke, Vagsbygd, Norway

[73] Assignee: Elkem-Spigerverket A.S., Oslo, Norway

[22] Filed: Mar. 19, 1973

[21] Appl. No.: 342,730

[30] Foreign Application Priority Data
Mar. 22, 1972 Norway................................ 943/72

[52] U.S. Cl......................................... 55/71, 55/74
[51] Int. Cl............................................. B01d 19/00
[58] Field of Search .............. 55/71, 74, 79, 52, 54, 55/59; 423/241, 242; 204/67

[56] References Cited
UNITED STATES PATENTS
| | | | |
|---|---|---|---|
| 3,503,184 | 3/1970 | Knapp et al. | 55/77 X |
| 3,721,066 | 3/1973 | Teller | 55/74 X |
| 3,760,565 | 9/1973 | Fish | 423/241 X |

*Primary Examiner*—Charles N. Hart
*Assistant Examiner*—Ferris H. Lander
*Attorney, Agent, or Firm*—Eyre, Mann & Lucas

[57] ABSTRACT

Fluorine from waste gases is recovered by contacting the gases with aluminum oxide in the presence of steam. The steam increases the adsorption rate of the aluminum oxide thereby improving fluorine recovery.

8 Claims, No Drawings

METHOD OF RECOVERING FLUORINE FROM WASTE GASES

The present invention relates to a method of removing and recovering gaseous fluorine components from industrial waste gases, especially waste gases from furnaces used in the melt electrolytic production of aluminum.

In the melt electrolytic production of aluminum gaseous fluorine components are liberated in amounts up to 10% by volume but usually more on the order of 1% or less by volume. Recovery of these gaseous fluorine components is desirable for a number of reasons. For one, the fluorine components are quite valuable if they can be recovered and used again in the aluminum furnace. On the other hand, if the fluorine gases are not recovered and escape into the atmosphere, they are highly detrimental to the environment, affecting both plant and animal life. Because of the relatively new and stringent anti-pollution requirements in effect throughout much of the world, it is necessary to remove these fluorine components from waste gases and, since this must be done, it is of course of advantage to recover the fluorine gases economically and in a form in which they can be reused.

The most common method of recovering fluorine from waste gases from melt electrolytic furnaces for production of aluminum is to bring the waste gases into contact with activated aluminum oxide. The fluorine will be adsorbed on the surface of the oxide, some of it chemically and some of it physically. The aluminum oxide with the adsorbed fluorine can then be returned as a raw material to the furnace where the aluminum electrolysis is carried out. However, in order to be effective, it is necessary that the fluorine be so strongly bonded to the oxide that it is not liberated from the oxide during normal furnace temperatures of about 500°C.

Fluorine which is chemically bound to the aluminum oxide is strongly enough bound to resist decomposition at furnace temperatures. However, the fluorine which is only physically bound is not strongly enough bound to resist these furnace temperatures and will be liberated before it can be effectively utilized. It will thus be seen that the desired result is to have as much as possible of the fluorine chemically bound rather than physically bound.

While it is thus desirable to have as much fluorine as possible chemically bound, it's not quite that simple. The adsorptive rate of aluminum oxide increases with increasing specific surface but so also does the cost of the material. For example, aluminum oxide with a specific surface of 150 m$^2$/g will give reasonably good results except that the economics of the situation generally do not permit the use of aluminum oxide with this high a specific surface. The usual commercial quality of the aluminum oxide is more on the order of 59 m$^2$/g. An aluminum oxide with this specific surface will only bind about 1.7% by weight fluorine chemically and any other fluorine which the oxide binds is done physically and will be driven off when subsequently used at aluminum furnace temperatures. Since it is desired to recover and use as much of the fluorine as possible, it becomes necessary to adjust the quantity of the aluminum oxide in relation to the quantity of fluorine in the gases so that the adsorption of fluorine will not exceed that which can be chemically bound i.e., about 1.7% by weight. While this procedure will work, it requires great quantities of the aluminum oxide and correspondingly large dimensioned apparatus to hold all of the aluminum oxide. It will be appreciated that such a low yield also requires increased handling costs and the like.

It has now been discovered that the amount of fluorine chemically bound to the aluminum oxide can be materially increased by the introduction of steam to the dry gas mixture. By dry gas mixture it is meant waste gases to which no water has been intentionally added. It will be appreciated that dry waste gases can contain a small quantity of moisture since the waste gases essentially comprise atmospheric air. However, the moisture present in atmospheric air is not sufficient to materially increase the chemical bonding of fluorine to the aluminum oxide.

The exact quantity of steam to be added to the waste gases depends upon the particular circumstances. An increasing volume of steam will cause an increase in the chemical adsorbtivity of the aluminum oxide with respect to fluorine but, of course, the higher the volume of steam the higher its cost. Therefore, the amount of steam to be employed will depend upon the economic relationship between the cost of steam and the cost of the aluminum oxide.

The amount of steam added must be at least 0.5% by volume of the waste gases. The maximum amount of steam to be added will usually be determined by economic factors, but where very dilute gases are used the content of steam will generally be no more than 25% since there is no advantage above this limit. Where concentrated gases with higher content of fluorine are being treated, the proportion of steam can be as high as 95% by volume.

The method of introducing steam is a matter of choice with the user. For example, the steam can be added directly to the waste gases as a separate stream or it can be added to the waste gases in a fluidized bed reactor. Alternatively, the dry fluorine-containing gases can be admixed with gases having moist fluorine. Another acceptable method is to use moist aluminum oxide. It will be appreciated that there are other known methods of adding moisture to the waste gases and that such additional methods may also be employed. Also, where desired, a plurality of the foregoing methods may be employed to add steam to the waste gases.

While it is not critical how the moisture is added, it is critical that the moisture be added as steam or converted into steam. It is therefore necessary that the contacting of fluorine-containing waste gases with the aluminum oxide take place at temperatures above the boiling point of water in the particular environment. This will generally be above 100°C. and may be higher where the boiling point of water is raised by the particular environment of the fluorine-containing gases and the aluminum oxide.

The upper limit of temperature is the temperature at which physically bound fluorine will be liberated by the aluminum oxide during the time interval that the fluorine-containing waste gases will be in contact with the aluminum oxide. Where the contact time is relatively short, these temperatures can be as high as 600°C. but it is generally preferable to maintain the temperature below 500°C. and best results are obtained when the temperature is maintained below 300°C.

A waste gas mixture containing approximately 0.3% by volume HF was brought into contact with aluminum oxide having a specific surface of 57 m²/g at a temperature maintained at about 110°C. When 99.9% of the fluorine in the gas stream had been removed, it was found that the aluminum oxide had adsorbed 6.5% fluorine by weight. When this aluminum oxide with adsorbed fluorine was heated at a temperature of 500°C. some of the fluorine was liberated and at the end of the liberation of fluorine it was found that only 1.7% fluorine remained thus indicating that 1.7% of the adsorbed fluorine was chemically bound to the aluminum oxide. When the same test was repeated under identical conditions except that the waste gas mixture contained 4% by volume water, it was found that the same 6.5% fluorine was adsorbed by the aluminum oxide in the removal of 99.9% of the fluorine from the gas. However, when the material with adsorbed fluorine in this case was heated to 500°C., until the liberation of fluorine stopped, it was found that there was still 6.3% fluorine remaining thus indicating that 6.3% of the adsorbed fluorine was chemically bound.

The percentage of fluorine which is chemically bound when steam is employed is not limited to cases where the aluminum oxide has a specific surface of 57 m²/g. The following Table indicates the high percentage of fluorine which is chemically bound when steam is added to the fluorine-containing waste gases. In the Table, 4% by volume of steam was admixed with waste gases, the HF content being 0.3% and the balance of 95.7% being air. The adsorption was carried out at temperatures of about 110°C. and was continued until 99.9% of the fluorine in the gas stream was removed. Physically bound fluorine was liberated by heating the material to about 500°C. until the liberation of fluorine stopped. The results of the test were as follows:

TABLE I

| Type Oxide | Specific Surface | Weight % F adsorbed | % F remaining after heating to 500°C. |
|---|---|---|---|
| Furnace quality oxide I | 30.0 m²/g | 3.5 | 3.4 |
| Furnace quality oxide II | 57.0 m²/g | 6.5 | 6.3 |
| $Al_2O_3$ calcined at 900°C. | 47.3 m²/g | 4.7 | 4.7 |
| $Al_2O_3$ calcined at 650°C. | 105.0 m²/g | 12.0 | 11.8 |
| $Al_2O_3$ calcined at 400°C. | 136.5 m²/g | 14.8 | 14.7 |

As shown by the Table, the absorption of fluorine increases with the specific surface of the oxide and, no matter what the specific surface of the oxide the addition of steam in accordance with the present invention will cause a high degree of fluorine to be chemically bound. The adsorption of fluorine can be increased by the employment of multi-step adsorption processes or by fluidized bed reactor processes of known type.

As shown by the previous Table, the adsorption of fluorine increases with the specific surface of the oxide. The percentage of fluorine adsorbed can also be increased by increasing the volume of the steam. In the following Table, adsorption was carried out at 110°C. with waste gases containing 0.3% by volume fluorine and the percentage of steam added to the waste gases was varied as indicated in the Table. The values given in the Table indicate the percentage of fluorine adsorbed by the aluminum oxide.

TABLE II — % Fluorine Adsorbed

| | Steam in the Gas by Volume | | |
|---|---|---|---|
| | 0.5% | 4% | 12.5% |
| a) Oxide with specific surface ca. 30 m²/g | 1.3 | 4.2 | 6.5 |
| Remaining after heating to 500°C. | 1.3 | 4.1 | 6.5 |
| b) Oxide with specific surface ca. 57 m²/g | 1.6 | 7.3 | 11.7 |
| Remaining after heating to 500°C. | 1.55 | 7.0 | 11.6 |

The Table shows that the addition of steam to the waste gases not only increases the amount of fluorine which will be chemically bound to the aluminum oxide but also increases the amount of fluorine which will be adsorbed by the aluminum oxide. Since the adsorption of fluorine is not directly proportional with the increase of the content of steam in the waste gases, it will be seen that utilizing the maximum amount of steam is not necessarily desirable from an economic point of view.

It will be understood that the claims are intended to cover all changes and modifications in the preferred embodiments of the invention, herein chosen for the purpose of illustration, which do not constitute departures from the spirit and scope of the invention.

What is claimed is:

1. A method of recovering fluorine from fluorine-containing waste gases comprising contacting the fluorine-containing waste gases with aluminum oxide in the presence of from about 0.5% to 95% water by volume of the waste gases, said contacting taking place at temperatures above the boiling point of the water in the particular contacting environment and below temperatures at which fluorine adsorbed by the aluminum oxide will be liberated during the period of contact whereby a product comprising aluminum oxide with fluorine chemically bound thereto and suitable for use in the melt electrolytic production of aluminum is obtained.

2. The method of claim 1 wherein the minimum temperature during the contacting is 100°C.

3. The method of claim 1 wherein the maximum temperature during the contacting is 600°C.

4. The method of claim 1 wherein the maximum temperature during the contacting is 500°C.

5. The method of claim 1 wherein the maximum temperature during the contacting is 300°C.

6. The method of claim 1 wherein the water content does not exceed 25%.

7. The method of claim 1 wherein at least part of the water is supplied as moisture in the aluminum oxide.

8. The method of claim 1 wherein at least part of the water is supplied by mixing dry fluorine-containing gases with moist fluorine-containing gases.

* * * * *